June 22, 1948.  I. CISSKI  2,443,601
READYING MECHANISM FOR THE MOTOR-CONTROL
MEANS FOR MOTION-PICTURE CAMERAS
Filed Jan. 12, 1946  6 Sheets-Sheet 1

INVENTOR
Irving Cisski
BY
Soans Pond & Anderson
ATTORNEYS

June 22, 1948.  I. CISSKI  2,443,601
READYING MECHANISM FOR THE MOTOR-CONTROL
MEANS FOR MOTION-PICTURE CAMERAS
Filed Jan. 12, 1946  6 Sheets—Sheet 6

Inventor:
Irving Cisski,
By Isaacs, Band & Henderson
Attorneys.

Patented June 22, 1948

2,443,601

UNITED STATES PATENT OFFICE 2,443,601

READYING MECHANISM FOR THE MOTOR-CONTROL MEANS FOR MOTION-PICTURE CAMERAS

Irving Cisski, Schiller Park, Ill., assignor to Ampro Corporation, Chicago, Ill., a corporation of Illinois Application January 12, 1946, Serial No. 640,951

8 Claims. (Cl. 88—17)

This invention relates to mechanism for readying motor-control means for motion picture cameras.

In motion picture cameras, particularly of the type where the film is encased in a magazine by the film manufacturer for return to it for processing, it is imperative that the readiness of the operating-control means for exposing the film be dependent upon whether the magazine is correctly and completely in the magazine compartment. When the magazine is in the process of being taken out of or placed in its exposure position in the magazine compartment of the camera, it is desirable to render the operating-control means ineffective until the magazine has been completely removed or has been properly placed in its exposure position in the compartment. Moreover, the curtain, for the film-exposure aperture of the magazine, must be drawn over the aperture before the magazine has been withdrawn very far from its exposure position, and later withdrawn from over the aperture as the magazine is replaced in exposure position.

The main objects of this invention, therefore, are, to provide a motion picture camera with improved mechanism for controlling the operative readiness of the motor-control means for taking pictures; to provide an improved motor-control-means readying-mechanism of this kind particularly adapted for use with motion picture cameras of the aforesaid magazine type; to provide an improved construction and coordination of the several parts of a motor-control-means readying-mechanism of this kind which simultaneously will effect the operative condition of the motor-control means, the locking or releasing of the film-magazine-compartment closure, the opening or closing of the film-exposure-aperture curtain, and the shifting of the magazine-film-drive clutch into or out of functioning position incidental to the placing of the film magazine in its exposure position or its retraction from said exposure position in said magazine compartment; and to provide improved mechanism of this kind which is simple and compact in its structure and easy and effective in operation.

The preferred embodiment of this invention is shown in the accompanying drawings, on an enlarged scale, in which.

A motion picture camera, constructed to embody therein this improved readying-mechanism 9 for a motor-control means 8 and a magazine film-feed- and takeup-gear clutch 7 comprises, a housing 10 divided by vertical and horizontal partitions 11 and 12 to form a magazine compartment 13, an operating-mechanism compartment 14, and a speed-regulating-mechanism compartment 15.

Access to the magazine compartment 13, for the insertion and removal of a magazine 16, is had through a corner door 17 of right-angle cross-section, hinged at 18 along the back of the housing 10. A spring 19, mounted on the door, serves to hold the magazine 16 in exposure position, with the button 20 on the magazine 16 firmly pressed against the button 21 on the housing 10, provided a tongue 22 is inserted under a strip 23. The strip 23, incidentally, is an integral part of the spring 19. When the tongue 22 is retracted, the spring 19 snaps the door 17 open.

A spring 24, secured to the under top side of the housing 10 within the compartment 13, yieldingly presses the magazine 16 against an embossing 25 in the partition 12 and an adjustable cam support 26, mounted in the forward part of the compartment 15. The cam 26 is in the form of a disc eccentrically mounted on a threaded pin 27 which is rigidly held in position by means of a set screw 28. The purpose of the cam 26 is to permit a proper positioning of the magazine 16 in its exposure position so that the engagement of the film-transport claw with the film perforations will insure precision in the transport of the film.

The magazine 16 is of a standard design, within which is mounted the film and associated with suitable mechanism, whereby it intermittently may be caused to move past the film-exposure aperture 29, formed in the front thereof through the action of a suitable transport claw (not shown) adapted to engage perforations 30 in the film exposed through a slot 31 in the magazine housing. The magazine is also equipped with the usual curtain for opening and closing the film exposure aperture 29. The movement of this curtain is effected by the shifting of a pin 32 a predetermined distance along the top edge of the magazine.

The magazine has the usual ring 33 embossed on one side thereof, and within this ring is formed a window 34, through which may be seen figures indicating the amount of film footage remaining unexposed.

Figure 1:
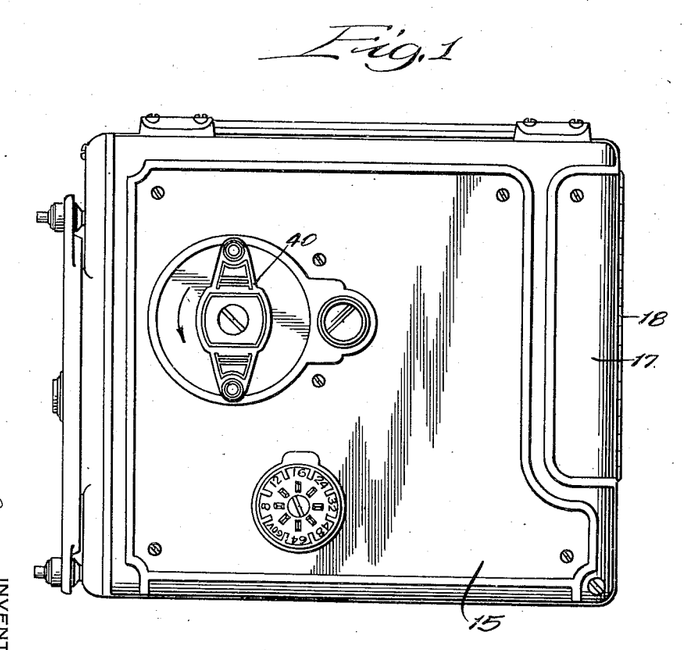
Fig. 1 is a side elevation of a motion picture camera, wherewith has been combined an improved magazine-actuated operative-readiness-control mechanism embodying this invention.
Figure 2:
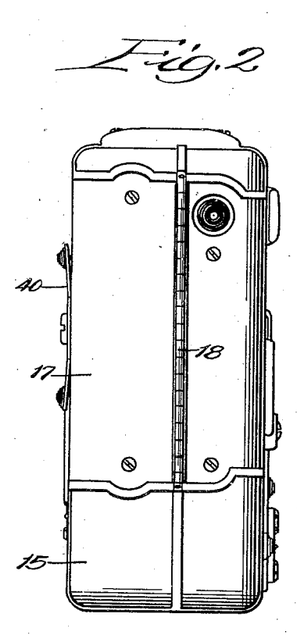
Fig. 2 is an end elevation of the camera.

The readying mechanism 9, or the lock-and-release mechanism as it might also be called, which co-acts with the magazine 16 for determining the readiness of the motor-control means, comprises a pair of members 35 and 36 reciprocatingly mounted on the inside face of the housing 10, within the magazine chamber 13. These members are adapted to simultaneously move in opposite directions under the action of a pinion 37 meshing with gear racks 38 and 39, and rotatable by means of a handle 40 (see Fig. 1), journaled on the exterior of said magazine housing.

The member 35 has a cam member 41 disposed at right angles to the face of the member 35 which extends through the partition 11 into the compartment 14. This cam member 41 is so shaped and positioned that upon the retraction of the member 35, incident to the opening of the magazine door 17, said cam 41 disables, or renders ineffective or impotent, and thus, in a sense, locks, the motor-control means 8 and retracts the clutch 7 from engagement with the magazine film-feed- and takeup-gear, as will appear more fully hereinafter. The member 35 is further provided with a shoulder 42 which is adapted to engage and be engaged by the embossed ring 33 on the magazine 16.

The member 36 has integrally formed thereon the tongue 22 which is adapted for engagement with the strap 23 on the door 17 for holding it closed. The member 36 also carries a spring detent 43, which is adapted to engage curtain pin 32 for shifting the curtain into and out of position to open and close the magazine-film aperture 29 at the time the magazine 16 is being placed respectively in or removed from its exposure position in magazine compartment 13.

Figure 4:
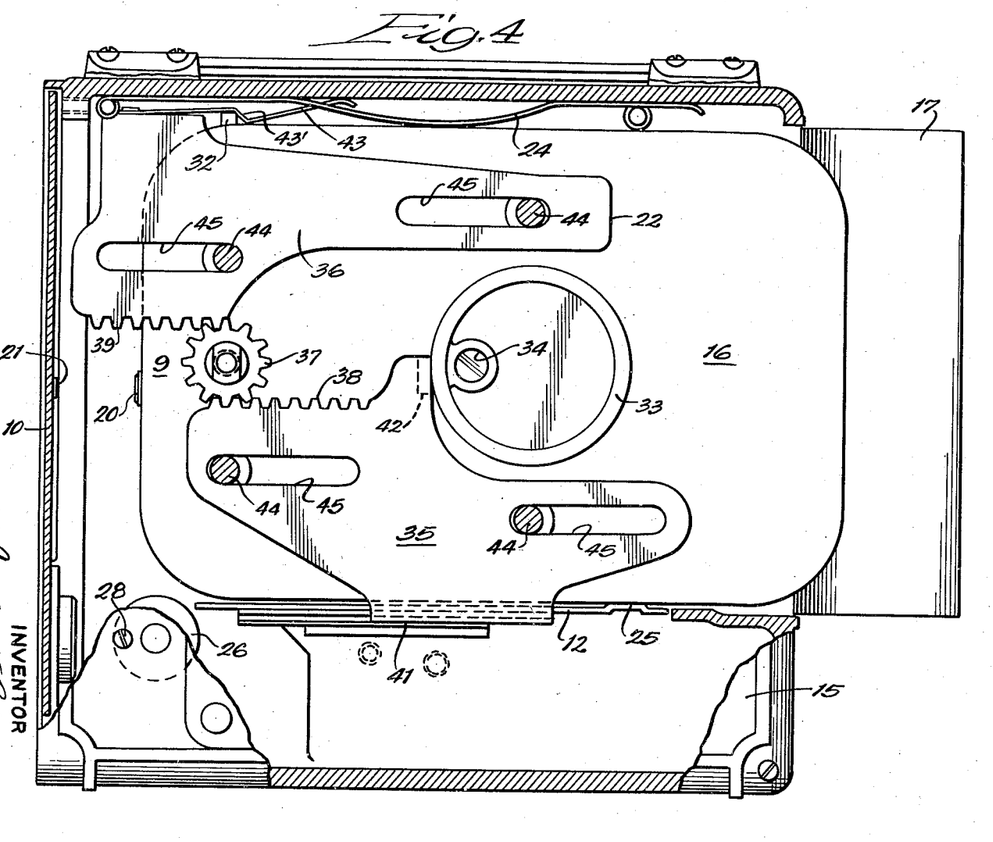
Fig. 4 is a view similar to Fig. 3, but showing the parts shifted to retract the magazine from its exposure position, thereby partially ejecting the magazine, resulting in a locking of the motor-control means.
Figure 5:
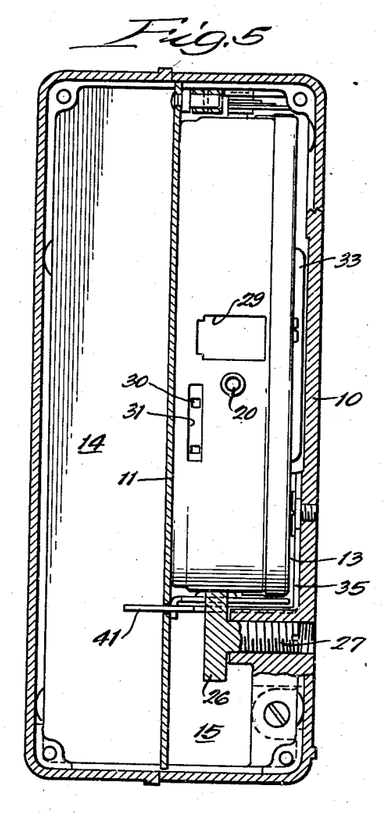
Fig. 5 is a transverse sectional view taken on the line 5—5 of Fig. 3.
Figure 6:
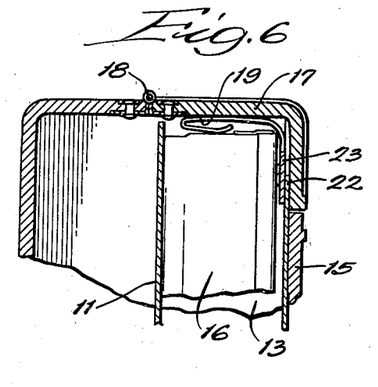
Fig. 6 is a fragmentary sectional view taken on the line 6—6 of Fig. 3.
Figure 8:
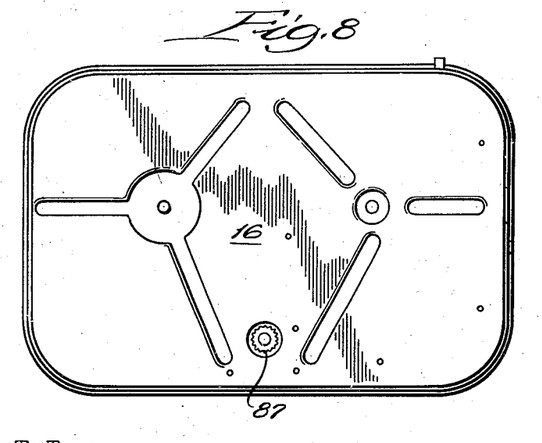
Fig. 8 is an actual size side view of a film magazine showing the film-feed- and takeup-gear with which the power operating mechanism for the film-shutter and -transport mechanism must be connected through the medium of a suitable clutch mechanism.
Figures 9, 10:
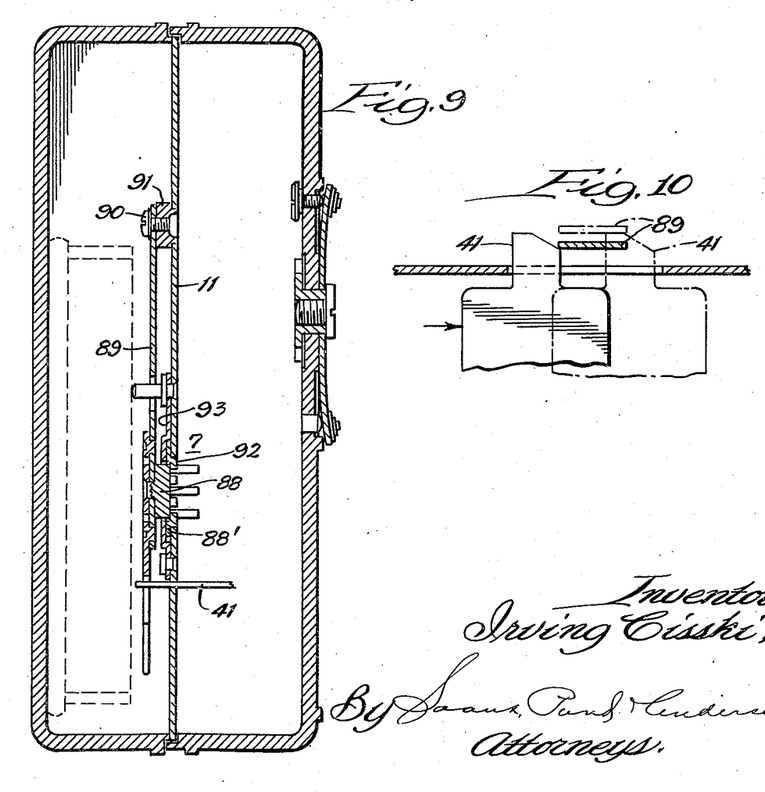
Fig. 9 is an enlarged transverse sectional view of the camera housing, on a different plane from that for Fig. 5, showing the arrangement of the magazine film-feed takeup-gear clutch and the control key which operates the cam-shifting means shown in Figs. 3 and 4. Associated mechanisms are omitted for the purpose of more clearly showing these particular parts.
Fig. 10 is an enlarged detail view showing the two positions of the cam member, operated by the cam-shifting means shown in Figs. 3 and 4, the dotted outline showing the position of the cam member which results in a locking or disabling of the motor control means and a retraction of the magazine film-feed and takeup-sprocket gear.

As will be noted most plainly from Figs. 8 and 4, the members 35 and 36 are supported on the housing 10 by means of headed pins 44 operating in slots 45 in said members.

The motor-control means 8 of the type more fully set forth in co-pending application Serial No. 640,949, filed January 12, 1946, comprises, a trigger bar 46, a pin-retracting lever 47, a cam rocker arm 48, and a cam lever 49, so associated that upon the shifting of a starting dial (not shown) the spring motor will cause the operation of the film-shutter and -transport mechanism (not shown) unless the operative relationship of the afore-named parts has been rendered ineffective by the magazine-controlled cam member 41 or a shifting of the torque-actuated arm 50.

The trigger bar 46 approximates the form of a T, with the stem 51 extending nearly the full length of the housing 10 and with the transverse part 52 located near the forward end of the housing adjacent to the front end cap, wherein is enclosed the film-shutter and -transport mechanism as disclosed in co-pending application Serial No. 640,952, filed January 12, 1946. The trigger bar 46 is slotted at 53 and 54 whereby it is slidably supported on the pin 55, which is secured to the partition 11, and a bushing 56, mounted on a machine screw 57 secured to the adjacent housing 10. The bar 46 is guided in its sliding movement by having the upper end of the transverse part 52 received in a flanged roller 58 mounted on a plate 59 secured to the housing 10 by means of screws 60.

Figure 7:
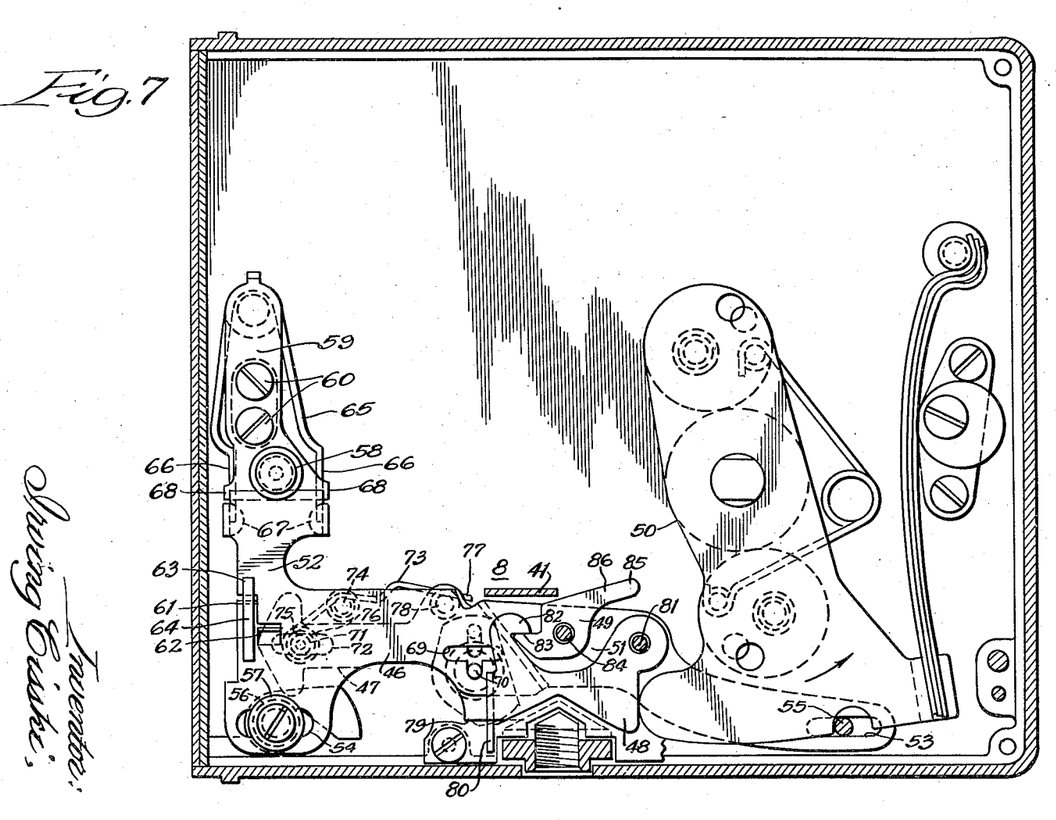
Fig. 7 is an enlarged transverse sectional view of the camera showing in elevation the related parts of the motor-controlled means, the operative condition of which is determined by the improved magazine-actuated mechanism embodying this invention.

Tongues or stops 61 and 62 are upset from the transverse part 52 of the trigger bar 46 so that upon the shifting of the trigger bar 46 one or the other may be moved into and out of engagement with a shoulder 63 on a trigger cam 64. The cam 64, being connected to the motor mechanism, through a suitable gear train, rotates in a clock-wise direction (as viewed from the left of Fig. 7) when the trigger bar 46 is shifted to move one or the other of the stops 61 or 62 out of the path of said trigger cam shoulder 63.

The trigger bar 46 is held in its normal or neutral position, with the stop 61 engaged by the shoulder 63 on the cam disc 64, by means of a hairpin-shaped spring 65 secured at the upper end of the plate 59 so that the ends 66 of the spring bear against and are retained in position by the flanged ears 67 formed on the upper end of the transverse part 52 of said trigger bar 46. Comparable flanged ears 68, formed on the plate 59, engage the respective legs of the spring 65 and limit them to movement in but one direction.

A T-shaped slot 69 is formed in the stem 51 of the trigger bar 46, a little less than half the distance of its length from the transverse part 52. The slot 69 receives a pin 70 carried on the pin-retracting lever 47.

The pin-retracting lever 47 simulates the shape of a pistol and is supported on the trigger bar 46 on a sliding pivot formed by a pin 71 secured to the trigger bar 46 and extending through a slot 72 formed in the forward end of the pin-retracting lever 47. A spring 73, secured by a pin 74 on the trigger bar 46, has the end 75 thereof received in a slot 76 formed in the pin 71 and the other end 77 pressing against a pin 78 on the pin-retracting lever 47. The pin 70 is thereby urged into the bottom of the stem of the T-shaped slot 69 in the trigger bar 46, so that the trigger bar 46 and the pin-retracting lever 47 will move as a unit, and the bottom edge 79 of the rear end of the pin-retracting lever 47 is positioned for engagement by a shoulder 80 on the cam rocker arm 48, as will more fully hereinafter appear.

The cam rocker arm 48 is pivoted to a pin 81 secured to the partition 11. With the camera in its normal upright position the weight of the cam rocker arm 48 retracts it from the edge 79 of the lever 47, unless, perchance, the balance of the cam lever 49 should be such that the engagement of the hook 82 with the shoulder 83 on the cam lever 49 will cause the shoulder 80 on the cam rocker arm 48 to be held in contact with said edge 79. On the other hand, the balance of the cam lever 49 may be such that the lower edge of the shoulder part 80 may rest on the bottom of the camera housing.

The cam lever 49 is pivoted on a pin 84 secured to the partition 11. The pin 84 is positioned on the cam lever 49 so that the end 85 of the lever overbalances the other end. Thus the shoulder 83 is normally held against the hook 82 of the cam rocker arm 48. This mounting of the cam lever 49 locates the inclined surface 86, of the end 85, in the path of the magazine-controlled cam member 41, so that the movement of the latter to the right of Fig. 7 will depress the outer end 85 of the cam lever 49. Such a depression will cause an elevation of the rocker arm 48 so as to raise the inner end of the pin-retracting lever 47, thereby retracting the pin 70 from the stem part of the T-shaped slot 69 whereupon control means 8 is rendered inoperative.

The construction and operation of the torque-actuated arm 50 for disabling or rendering ineffective the motor control means 8, not being affected by this readying mechanism, is not described here. The construction and function, however, is more fully set forth in co-pending application Serial No. 640,957, filed January 12, 1946.

The clutch mechanism 7 by means of which the camera motor (not shown) is operatively connected to the film-feed- and takeup-gear 87 (see Fig. 8) is more fully set forth in co-pending application Serial No. 640,953, filed January 12, 1946. Such a mechanism includes a pronged element 88 rotatably supported on a resilient member 89, suspended on the partition 11, and shiftable axially on a supporting gear 88' into and out of engagement with the film-feed- and takeup-gear 87 on the magazine 16. The resilient member 89 is attached at its upper end in spaced relationship to the housing partition 11 by means of a screw 90 and a ferrule or post 91. This member 89 extends down below the cam member 41 and has the pronged element 88 attached thereto intermediate its end. The gear 88' is journaled on the partition 11 by its hub part 92 and held against displacement by means of a strap 93.

Figure 3:
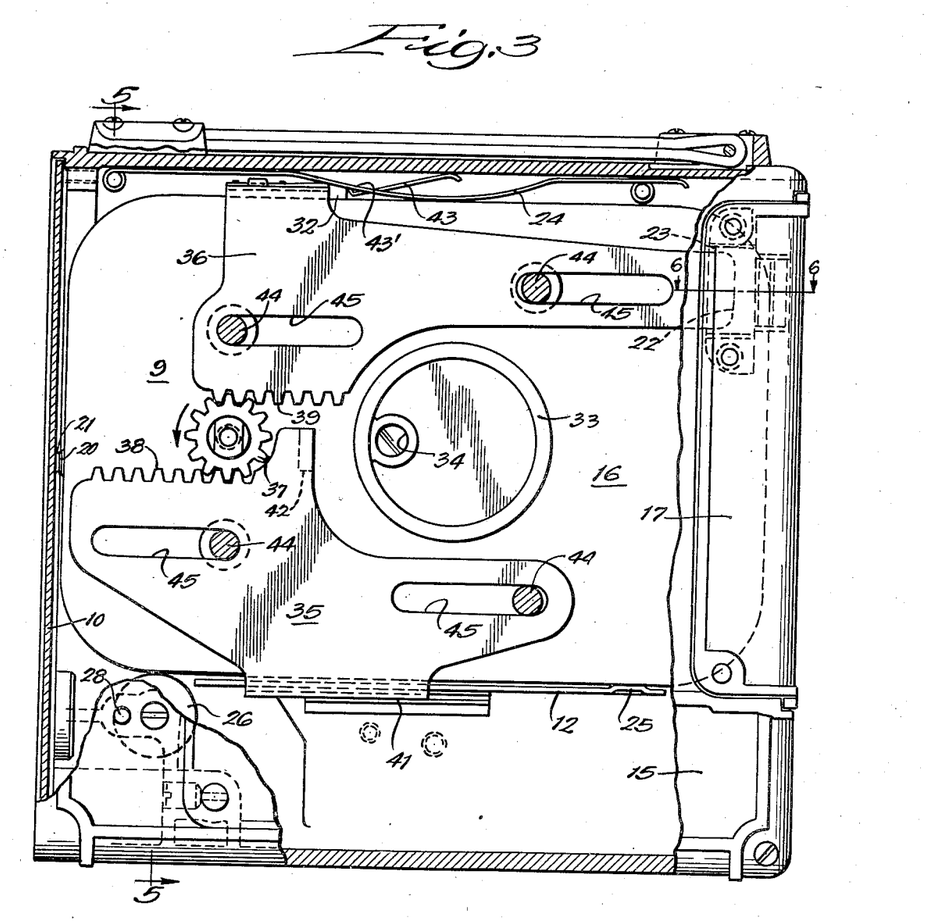
Fig. 3 is an enlarged longitudinal cross-sectional view showing the mechanism which controls the locking and releasing of the operating-control means, incident to the placing of the film magazine in or retracting it from its exposure position in the magazine compartment, the several parts in this figure being shown in the position which they occupy when the motor-control means is released and the camera ready for operation.

The operation of this readying mechanism for the motor-control means and the film-feed- and takeup-gear clutch of a motion picture camera, is as follows:

Assume that the magazine 16 is in exposure position as shown in Fig. 3. With the member 35 in this position the cam part 41 has been retracted so that the motor-control means 8 is free to function appropriately when released by the operating dial provided for. Likewise, the tongue 22 on the member 36 is in engagement with the strap 23 so that the door 17 is locked in its closed position. The spring 19 presses the magazine into exposure position with the button 20 against the housing button 21. The film in the magazine thus coincides with the focal plane of the camera. Likewise the spring 24 is pressing the magazine firmly against the embossing 25 and disc 26 so that the film perforations 30 are in proper position for accurate contact with the transport claw. The clutch 7 is in engagement with the film-feed- and takeup-gear 87.

When it is desired to remove the magazine 16, the operator turns the handle 40 counterclockwise (see Figs. 1 and 3) a distance sufficient to move member 35 to the right to bring the shoulder 42 into engagement with the embossed ring 33 on the film magazine 16. This action also shifts the member 36 in the opposite direction and withdraws the tongue 22 from its engagement with the strap 23. Thereupon the spring 19 causes the door 17 to snap open. This movement of the member 36 also brings the shoulder 43' on the spring detent 43 approximately into abutting engagement with the curtain pin 32 and moves the pin to the left of Fig. 3, thereby shifting the film curtain to partially close the film aperture 29. Moreover, this initial movement of the member 35 shifts the cam member 41 so as to (1) disable or render impotent the motor-control means 8, and (2) retract the clutch 7 from operative engagement with the feed- and takeup-gear of the film magazine.

With the door 17 open the operator continues to turn the handle 40 counterclockwise, which causes the pinion 37 to continue the opposite shifting of the members 35 and 36. By reason of the engagement of the shoulder 42 with the embossed ring 33, the magazine is shifted rearwardly (to the right of Fig. 3) until the members 35 and 36 have reached the opposite limits of their movement, as is shown in Fig. 4.

Such completed movement of the members 35 and 36 completes the shifting of the curtain pin 32 toward the forward end of the magazine 16 so as to move the curtain over the film-exposure aperture 29, and also moves the back end of the magazine out through the opening in the housing a sufficient distance to permit it to be grasped by the fingers of the operator and completely removed.

If it is desired to have the camera conveniently carried around without a film magazine therein, the door 17 may be shifted into its closed position and the handle 40 turned clockwise so as to reverse the movement of the members 35 and 36, whereupon the tongue 22 will be shifted into engagement with the strap 23, thus locking the door. This will retract the cam member 41, thereby rendering effective the motor-control means 8, and permit the operation of the film-shutter and -transport mechanism just as if a magazine were in place in the compartment 13.

When it is desired to use the camera for the taking of pictures, the magazine 16 is inserted into the opening at the rear of the compartment 13 until the embossed ring 33 comes into contact with the shoulder 42 on the member 45. The continued pushing of the magazine into the compartment shifts the members 35 and 36, the former forwardly of the camera and the other rearwardly thereof, until the button 20 comes into contact with the button 21. Thereupon, the operator closes the door 17 and rotates the handle clockwise. This rotation of the handle 40 causes the pinion 37 to complete the shifting of the members 35 and 36 into the positions in which they are shown in Fig. 3. This occasions a reversal of all of the results hereinbefore mentioned, in connection with the shifting of the members 35 and 36 to eject the magazine 16. Accordingly, the cam part 41 is retracted so as to restore the operative condition of the motor control means 8 and re-engage the clutch 7 with the film-feed- and takeup-gear 87 for the magazine. The spring detent 43 engages the curtain pin 32 and shifts it so as to cause a retraction of the curtain from the film-exposure aperture 29, and the tongue 32 is shifted into engagement with the strap 23 so that the door 17 is locked in its closed position.

Variations and modifications in the details of structure and arrangement of the parts may be resorted to within the spirit and coverage of the appended claims.

I claim:

1. In a device of the class described, the combination with a housing having a pair of compartments one of which is adapted to receive a film magazine and the other of which contains motor-control means, of a member reciprocatingly mounted on said housing in said magazine compartment and having a shoulder thereon positioned to contact a shoulder on a standard film magazine whereby said member and magazine may be simultaneously shifted in said compartment by force applied to either said member or said magazine, a part extending into said motor-control-means compartment and actuated by said member to be moved into and out of position to alternately lock and release said motor-control means with the opposite movements of said member, and other means on said housing externally of said compartment for manually shifting said member.

2. In a device of the class described, the combination with a housing having a pair of compartments one of which is adapted to receive a film magazine and the other of which contains motor-control means, of a hinged closure for said magazine compartment, a pair of members slidably mounted in said magazine compartment, one of said members having a shoulder thereon positioned to contact a shoulder on a standard film magazine whereby said member and magazine may be simultaneously shifted in said compartment by force applied to either said member or said magazine, a part on said one member extending into said motor-control-means compartment and movable into and out of position to alternately lock and release said motor-control means when said member is moved into and out of one of its extreme positions, a part on the other of said members movable into and out of position to alternately lock and release said magazine-compartment closure when said other member is moved into and out of one of its extreme positions, means connecting said members to coordinate the shifting thereof, and other means on said housing externally of said compartment for manually shifting said connecting means.

3. In a device of the class described, the combination with a housing having a pair of compartments one of which is adapted to receive a film magazine equipped with an aperture-curtain shifting pin and the other of which contains motor-control means, of a hinged closure for said magazine compartment, a pair of members slidably mounted in said magazine compartment, one of said members having a shoulder thereon positioned to contact a shoulder on a standard film magazine whereby said member and magazine may be simultaneously shifted in said compartment by force applied to either said member or said magazine, a part on said one member extending into said motor-control-means compartment and movable into and out of position to alternately lock and release said motor-control means when said member is moved into and out of one of its extreme positions, a part on the other of said members movable into and out of position to alternately lock and release said magazine-compartment closure when said other member is moved into and out of one of its extreme positions, another part on said other member positioned to engage said curtain-shifting pin to oppositely shift said curtain when said other member is shifted to lock or release said closure, means connecting said members to coordinate the shifting thereof, and other means on said housing externally of said compartment for manually shifting said connecting means.

4. In a device of the class described, the combination with a housing partitioned to provide a pair of compartments, one adapted to receive a film magazine and the other to contain motor-control means, of a hinged closure for said magazine compartment, a pair of oppositely-shiftable members arranged on said housing partition one above the other on opposite sides of the transverse central plane of said magazine compartment, a part on one of said members extending into said motor-control-means compartment and movable into and out of position to alternately lock and release said motor-control means when said member is moved into and out of one of its extreme positions, another part on the other of said members movable into and out of position to alternately lock and release said magazine-compartment closure when said other member is moved into and out of one of its extreme positions, rack teeth formed on the opposed edges of said members, a pinion journaled on said housing and engaging said racks so as to coordinate the shifting thereof, and a manually-actuated member externally of said housing connected to rotate said pinion for shifting said members through certain parts of their movement.

5. In a device of the class described, the combination with a housing partitioned to provide a pair of compartments, one adapted to receive a film magazine equipped with an aperture-curtain shifting pin and the other to contain motor-control means, of a hinged closure for said magazine compartment, a pair of oppositely-shiftable members arranged on said housing partition one above the other on opposite sides of the transverse central plane of said magazine compartment, a part on one of said members extending into said motor-control-means compartment and movable into and out of position to alternately lock and release said motor-control means when said member is moved into and out of one of its extreme positions, another part on the other of said members movable into and out of position to alternately lock and release said magazine-compartment closure when said other member is moved into and out of one of its extreme positions, another part on said other member adapted to engage said curtain-shifting pin to oppositely shift said curtain when said other member is moved into and out of one of its extreme positions, rack teeth formed on the opposed edges of said members, a pinion journaled on said housing and engaging said racks so as to coordinate the shifting thereof, and a manually-actuated member externally of said housing connected to rotate said pinion for shifting said members through certain parts of their movement.

6. In a device of the class described, the combination with a housing partitioned to provide a pair of compartments, one adapted to receive a film magazine and the other to contain motor-control means, of a hinged closure for said magazine compartment, a pair of oppositely-shiftable members arranged on said housing partition one above the other on opposite sides of the transverse central plane of said magazine compartment, a part on one of said members extending into said motor-control-means compartment and movable into and out of position to alternately lock and release said motor-control means when said member is moved into and out of one of its extreme positions, another part on the other of said members movable into and out of position to alternately lock and release said magazine-compartment closure when said other member is moved into and out of one of its extreme positions, rack teeth formed on the opposed edges of said members, a pinion journaled on said housing and engaging said racks so as to coordinate the shifting thereof, a manually-actuated member externally of said housing connected to rotate said pinion for shifting said members through certain parts of their movement, and a spring on said magazine closure adapted to engage a magazine in said compartment and hold it firmly in place when said door is locked in its closed position and also adapted to automatically swing said door open when said one part on said other member is retracted from engagement with said closure.

7. In a device of the class described, the combination with a housing having a pair of compartments one of which compartments is adapted to receive a film magazine equipped with a film-feed- and takeup-gear and the other of which compartments contains motor-control means and a motor-driven clutch member shiftable into and out of engagement with said magazine gear, of a member reciprocatingly mounted on said housing in said magazine compartment and having a shoulder thereon positioned to contact a shoulder on a standard film magazine whereby said member and magazine may be simultaneously shifted in said compartment by force applied to either said member or said magazine, a part extending into said motor-control means compartment and actuated by said member to be moved into and out of position simultaneously to alternately lock and release said motor-control means and alternately disengage and release for engagement said clutch and gear with the opposite movements of said member, and other means on said housing externally of said compartment for manually shifting said member.

8. In a device of the class described, the combination with a housing partitioned to provide a pair of compartments one of which compartments is adapted to receive a film magazine equipped with an apertured curtain-shifting pin and a film-feed- and takeup-gear and the other of which compartments contains motor-control means, of a flexible member mounted on said partition in said motor-control means compartment, a clutch element carried by said flexible member and axially shiftable into and out of engagement with said magazine gear, a hinged closure for said magazine compartment, a pair of members slidably mounted in said magazine compartment, one of said members having a shoulder thereon positioned to contact a shoulder on a standard film magazine whereby said member and magazine may be simultaneously shifted in said compartment by force applied to either said member or said magazine, a part on said one member extending into said motor-control means compartment and movable into and out of position simultaneously to alternately lock and release said motor-control means and alternately retract and release said flexible member when said one magazine member is moved into and out of one of its extreme positions, a part on the other of said magazine members movable into and out of position to alternately lock and release said magazine compartment closure when said other magazine member is moved into and out of one of its extreme positions, another part on said other magazine member positioned to engage said curtain-shifting pin to oppositely shift said curtain when said other magazine member is shifted to lock or release said closure, means connecting said magazine members to coordinate the shifting thereof, and other means on said housing externally of said compartment for manually shifting said connecting means.

IRVING CISSKI.

REFERENCES CITED

The following references are of record in the file of this patent:

UNITED STATES PATENTS

| Number | Name | Date |
| --- | --- | --- |
| 2,028,608 | Howell | Jan. 21, 1936 |
| 2,080,021 | Wittel | May 11, 1937 |
| 2,175,538 | Morsbach et al. | Oct. 10, 1939 |
| 2,323,576 | Sperry | July 6, 1943 |
| 2,357,158 | Zuber | Aug. 29, 1944 |